US009596481B2

(12) United States Patent
Alipour Kashi et al.

(10) Patent No.: US 9,596,481 B2
(45) Date of Patent: Mar. 14, 2017

(54) APPARATUS AND METHOD FOR VIDEO DATA PROCESSING

(71) Applicant: ATI Technologies ULC, Markham (CA)

(72) Inventors: Sahar Alipour Kashi, Toronto (CA); Boris Ivanovic, North York (CA); Allen J. Porter, Sunderland (CA)

(73) Assignee: ATI Technologies ULC, Ontario (CA)

( * ) Notice: Subject to any disclaimer, the term of this patent is extended or adjusted under 35 U.S.C. 154(b) by 1050 days.

(21) Appl. No.: 13/754,221

(22) Filed: Jan. 30, 2013

(65) Prior Publication Data

US 2014/0211855 A1 Jul. 31, 2014

(51) Int. Cl.
*H04N 11/02* (2006.01)
*H04N 19/513* (2014.01)
*H04N 19/52* (2014.01)
*H04N 19/117* (2014.01)
*H04N 19/423* (2014.01)

(52) U.S. Cl.
CPC ......... *H04N 19/521* (2014.11); *H04N 19/117* (2014.11); *H04N 19/423* (2014.11); *H04N 19/52* (2014.11)

(58) Field of Classification Search
CPC .... H04N 19/117; H04N 19/423; H04N 19/52; H04N 19/521
See application file for complete search history.

(56) References Cited

U.S. PATENT DOCUMENTS

| 8,314,884 | B2* | 11/2012 | Wu | G06T 3/4007 348/441 |
| 2004/0005004 | A1* | 1/2004 | Demos | H04N 19/00696 375/240.08 |
| 2008/0175439 | A1* | 7/2008 | Kurata | G06T 7/2013 382/107 |
| 2008/0247462 | A1* | 10/2008 | Demos | H04N 19/597 375/240.03 |
| 2009/0147098 | A1* | 6/2009 | Li | H04N 1/6077 348/223.1 |
| 2010/0098345 | A1* | 4/2010 | Andersson | H04N 19/85 382/238 |
| 2010/0177239 | A1* | 7/2010 | Servais | H04N 7/014 348/441 |

(Continued)

*Primary Examiner* — Christopher S Kelley
*Assistant Examiner* — Deirdre Beasley
(74) *Attorney, Agent, or Firm* — Volpe and Koenig, P.C.

(57) ABSTRACT

Methods and apparatus for facilitating processing a reference frame to produce an output frame. Motion vector data for a block of reference frame pels estimates the displacement of the reference frame pels from corresponding pels in a prior input frame. Comparison metrics are produced for a pel of the reference frame with respect to that pel and a plurality of neighboring reference frame pels A first comparison metric is based on a comparison with corresponding pels of a prior output frame that corresponds to the prior input frame as previously processed. A second comparison metric is based on a comparison with corresponding pels of a motion compensated prior output frame derived from applying motion vector data to the pels of the prior output frame. A pel of the output frame that corresponds to the reference frame pel is determined using the first and second comparison metrics.

17 Claims, 2 Drawing Sheets

(56) References Cited

U.S. PATENT DOCUMENTS

| | | | | |
|---|---|---|---|---|
| 2011/0050993 A1* | 3/2011 | Wang | G06T 7/2013 | 348/452 |
| 2011/0299781 A1* | 12/2011 | Schoenblum | G06T 5/002 | 382/195 |
| 2011/0310295 A1* | 12/2011 | Chen | H04N 19/577 | 348/441 |
| 2012/0093225 A1* | 4/2012 | Kubo | H04N 7/467 | 375/240.16 |
| 2012/0155533 A1* | 6/2012 | Puri | H04N 19/176 | 375/240.02 |
| 2012/0169923 A1* | 7/2012 | Millar | H04N 19/61 | 348/399.1 |
| 2012/0219229 A1* | 8/2012 | Springer | G06T 5/003 | 382/199 |
| 2013/0051682 A1* | 2/2013 | Chung | G06T 3/4007 | 382/197 |
| 2013/0163666 A1* | 6/2013 | Leontaris | H04N 19/00569 | 375/240.12 |

* cited by examiner

APPARATUS AND METHOD FOR VIDEO DATA PROCESSING

FIELD

This application is related to processors and methods of video data processing acceleration.

BACKGROUND

One widespread method of capturing and/or displaying images is through the use of pixel-based image capture and/or display. As electronic imaging resolution has increased along with the increased demand of "real time" video display, the demands for quick and efficient processing of video image data continues to increase.

In image processing, pixels are generally represented by pixel data elements, commonly referred to as pels, that are often byte sized. For example, a pel may be defined by eight bits of data that represents one byte of data in a particular image display application.

Performing a comparative calculation of differences between pels is used in a variety of video processing algorithms. Generally these operations are done to rapidly compare one set of pels to another. For example, such a comparison can form a base image correlation operation in many motion search algorithms.

In such correlations, it is desirable to obtain a calculation of the differences between set of pels of a reference frame with similar sized sets of pels of a previous or subsequent frame as a search frame. It is common to make searches of a block of pels of a current frame as the reference frame for a "best matching" block of pels in an immediately preceding frame as the search frame.

One comparative calculation technique employed in such searching is known as the sum of the absolute differences (SAD). In a conventional SAD comparison operation, pel data of a search block of reference frame pels is compared with pel data of similarly sized blocks of search frame pels on an individual pel basis by summing the absolute value of the differences of corresponding individual pels from each respective block. Generally the block in the search frame that has the lowest SAD comparison value is selected as the "best matching" block and a motion vector is assigned to the search block based on the relative frame locations of the search block and the selected "best matching" block.

SUMMARY OF THE EMBODIMENTS

Methods and apparatus for facilitating processing image data of video frames are disclosed. In one embodiment, a processing component is configured to process a reference frame to produce an output frame. A first input is configured to receive motion vector data for a block of pels of the reference frame that estimates the displacement of the reference frame pels from corresponding pels in a prior input frame. A second input is configured to receive pel data for pels of a prior output frame corresponding to the prior input frame as previously processed.

An example processing component is configured to produce comparison metrics for a reference frame pel of the reference frame block based on a comparison of the reference frame pel and a plurality of neighboring reference frame pels with pels of the prior output frame. Typically, the prior output frame is the immediately preceding frame in a series of video frames. A first comparison metric is based on a comparison with corresponding pels of the prior output frame. A second comparison metric based on a comparison with corresponding pels of a motion compensated prior output frame derived from applying the motion vector data for the reference frame block to the pels of the prior output frame. The example processing component is configured to determine a pel of the output frame that corresponds to the reference frame pel using the first and second comparison metrics.

In one embodiment, the processing component is configured to use the first comparison metric to determine a first gain for use in blending the reference frame pel with a corresponding pel of the prior output frame to produce a first blended pel. The processing component is further configured to use the second comparison metric to determine a second gain for use in blending the reference frame pel with a corresponding pel of the motion compensated prior output frame to produce a second blended pel.

In one embodiment, the processing component can be configured to produce the first and second blended pels and to use the first and second comparison metrics, a motion vector variance value, and a motion vector metric to determine a third gain. In such case, the third gain is used in blending the first and second blended pels to produce a third blended pel upon which the output frame pel corresponding to the reference frame pel is based. In such case, the processing component may be configured to use the third blended pel as the output frame pel upon a condition that the third blended pel is in a range determined from the pel values of the reference frame pel and the plurality of neighboring reference frame pels.

In another embodiment, the processing component is configured to produce either the first blended pel or the second blended pel as a selected blended pel upon which the output frame pel corresponding to the reference frame pel is based. In such case, a selection decision may be made based on the first and second comparison metrics and only one blending of pels is then needed, .ie. the blending to produce the selected blended pel. Also, the processing component can be configured to use the selected blended pel as the output frame pel upon a condition that the selected blended pel is in a range determined from the pel values of the reference frame pel and the plurality of neighboring reference frame pels.

In some embodiments, the processing component is also configured to produce a third comparison metric for the reference frame pel based on a comparison of the reference frame pel and the plurality of neighboring reference frame pels with corresponding pels of the motion compensated prior input frame. In such case, the second and third comparison metrics can be used in determining a noise level that can then be used in determining the first and second gains.

In some embodiments, the processing component is configured to produce the first and second comparison metrics for the reference frame pel based on a comparison of a pel region defined by the reference frame pel and the plurality of neighboring pels that has fewer pels than the reference frame block. The reference frame block may, for example, be defined by at least an eight by eight pel array and the processing component may in turn be configured to produce the first and second comparison metrics for the reference frame pel based on a comparison of a pel region defined by a five by five pel array about the reference frame pel. In some embodiments, the processing component is configured to calculate the first and second comparison metrics for the output frame based on a sum of the absolute differences (SAD) comparative calculation. As will be apparent to those skilled in the art, other comparative metrics can readily be employed, such as, for example, the sum squared absolute differences (SSAD).

Corresponding methods to process image data of a reference frame to produce an output frame are also disclosed. Such methods may include determining motion vector data for a block of pels of the reference frame that estimates the displacement of the reference frame pels from corresponding pels in a prior input frame. In further embodiments, a computer-readable storage medium stores a set of instructions for execution by a processor to facilitate processing of video image data of a reference frame to produce an output frame in accordance with the disclosed methods.

In another embodiment, a computer-readable storage medium stores a set of instructions for execution by one or more processors to facilitate manufacture of circuitry within an integrated circuit (IC) that is adapted to process a reference frame to produce an output frame. The IC having circuitry that includes a first input configured to receive motion vector data for a block of pels of the reference frame that estimates the displacement of the reference frame pels from corresponding pels in a prior input frame and a second input configured to receive pel data for pels of a prior output frame corresponding to the prior input frame as previously processed. The IC circuitry configured to produce comparison metrics for a reference frame pel of the reference frame block based on a comparison of the reference frame pel and a plurality of neighboring reference frame pels with pels of the prior output frame including a first comparison metric based on a comparison with corresponding pels of the prior output frame and a second comparison metric based on a comparison with corresponding pels of a motion compensated prior output frame derived from applying the motion vector data for the reference frame block to the pels of the prior output frame. The IC circuitry is configured to determine a pel of the output frame that corresponds to the reference frame pel using the first and second comparison metrics. The computer-readable storage medium may contain instructions that are hardware description language (HDL) instructions used for the manufacture of a device.

DETAILED DESCRIPTION

The following description of specific examples of the present invention is non-limiting. The examples are not intended to limit the scope and content of this disclosure.

Although a specific type of pel data comparison disclosed in the following examples is based on a sum of the absolute differences (SAD) calculation, the invention is not limited to such a specific arithmetic comparative operation between reference pel data and search image pel data. Other types of comparisons may be used in place of the SAD calculation.

Figure 1:
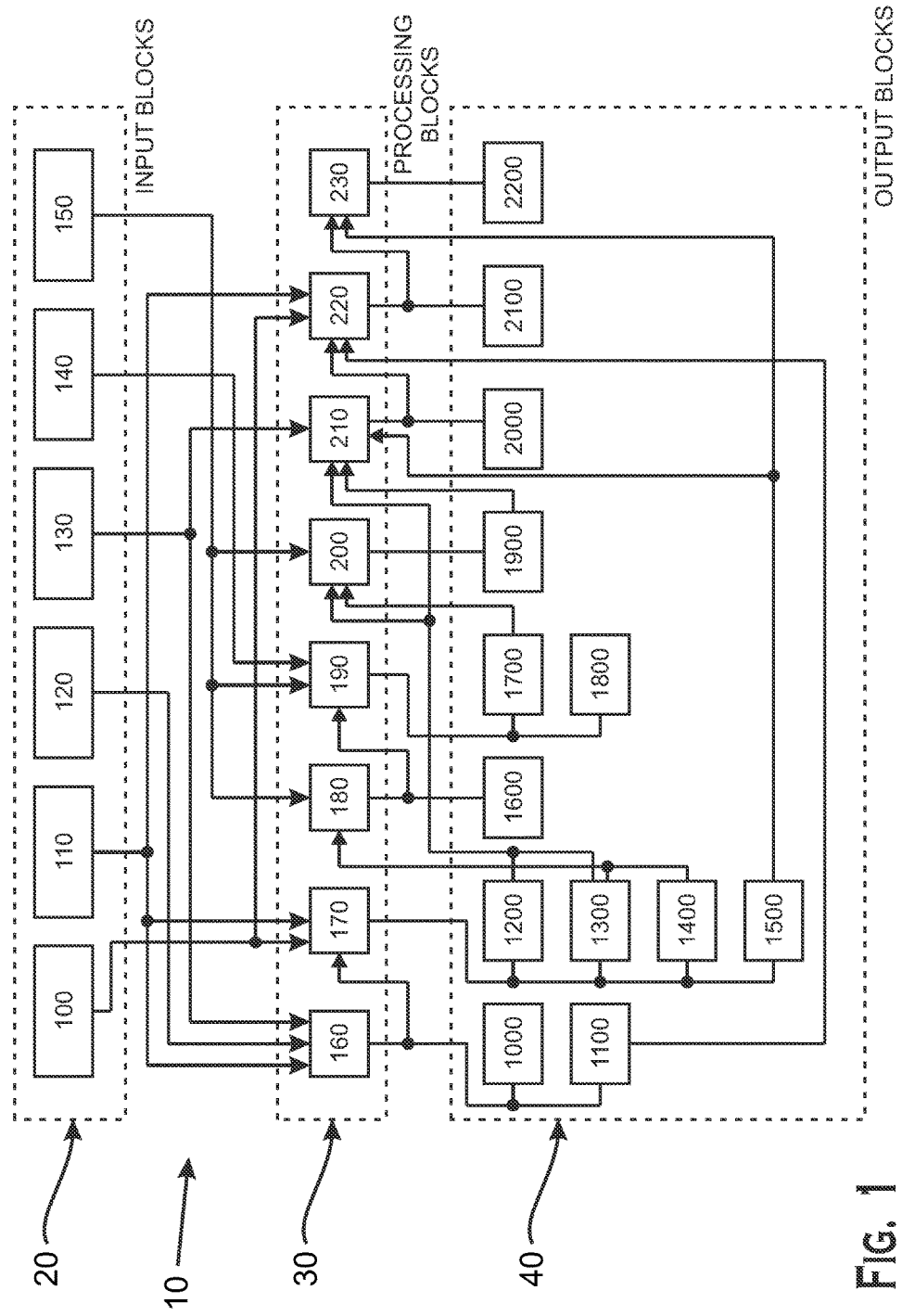
FIG. 1 is a block diagram that illustrates an example video data processing apparatus.

Referring to FIG. 1, an example apparatus 10 for video processing is illustrated that is configured to recursively process video frames for output. The apparatus 10 generally comprises input memory components 20, data processing components 30 and output memory components 40. Although discreet components may be provided, the memory components may be embodied in a single memory or other memory arrangement and the processing components may be embodied in single processing engine of a processor or in other arrangements.

In the illustrated example, pel data of a current or reference frame is stored in a first input memory component 100 and pel data related to an immediately preceding frame is stored in second and third input memory components 110, 120. The second input memory component 110 is configured to contain pel data of the previous frame as previously processed for output, i.e. the previous output, and the third input memory component 120 frame is configured to contain pel data of the previous frame as previously received for input, i.e. the previous input. In typical operation of the illustrated example, after the reference frame has been processed, the pel data stored for it in the first input memory component 100 is transferred to the third input memory component 120 to become the previous input, and pel data for a "next" frame is stored in the first input memory component 100 for processing.

A motion compensation component 160 is provided that adjusts the pel data of the previous output retrieved from the second input memory component 110 and the pel data of the previous input retrieved from the third input memory component 120 for motion between frames. In the illustrated example, the motion compensation component utilizes a previously-determined motion vector retrieved from a fourth input memory component 130 to perform this function.

In one embodiment, the motion vectors are provided for the entire frame on a block basis, where the current frame is partitioned into a plurality of blocks and motion vectors are assigned for each block through a search for a best matching block in the previous input using a comparison technique, such as based on a sum of absolute differences (SAD) of pel value. As a result, each pel in the block is accorded the motion vector assigned to the block in which it is located.

A motion vector metric, such as the SAD value corresponding to the assigned motion vector where the SAD comparison technique is used, may also be provided for each block, and stored in the fourth input memory component 130. Various other comparison methods are known in the art and may be used, but the SAD metric is widely used due to its relative simplicity and hardware support such as amd_sad( ) extensions in OpenCL.

Weighted linear interpolation may be used by the motion compensation component 160 to compensate for movements that are not a multiple of the grid elements. In the illustrated example, the pel data for the motion-compensated previous input is stored in a first output memory component 1000, and the pel data for the motion compensated previous output is stored in a second output memory component 1100. The motion compensated pel data for both the previous input and previous output is also fed to an error immunity component 170.

In the FIG. 1 example, the error immunity component 170 is configured to determine several comparison metrics with respect to each pel of the reference frame retrieved from the first input memory component 100. These metrics include a first comparison metric with respect to respective pels of the previous output retrieved from the second input memory component 110, a second comparison metric with respect to respective pels of the motion compensated previous output retrieved from the second output memory component 1100, and a third comparison metric with respect to respective pels of the motion compensated previous input retrieved from the first output memory component 1000. In the illustrated example, the first comparison metrics are stored in a third output memory component 1200; the second comparison metrics are stored in a fourth output memory component 1300; and the third comparison metrics are stored in a fifth output memory component 1400.

In the FIG. 1 example, the error immunity component 170 is configured to select a reference block of pel data from the reference frame for each pel of the reference frame and determine:
- a correlation value of a corresponding block at the same relative frame location from the previous output frame as the first comparison metric,
- a correlation value of a corresponding block at the same relative frame location from the motion compensated previous output as the second comparison metric, and
- a correlation value of a corresponding block at the same relative frame location from the motion compensated previous input as the third comparison metric.

In one example, a sum of absolute differences (SAD) calculation is used to determine the correlation values, but other comparison methods may be implemented in the error immunity component 170.

In one embodiment, the reference block of pel data for each pel is designated as a five by five pel array that includes the pel at the center of the five by five array. In the FIG. 1 example, the error immunity component 170 is configured to determine the range of pel values in the respective reference block for each pel and store that range value as an additional metric with respect to the pel in a sixth output memory component 1500.

In some embodiments, where the motion vectors stored in the input memory component 130 are determined on a block basis, smaller blocks of pels, i.e. blocks having fewer pels, are used by the error immunity component 170 to determine the correlation values as compared to the size of the blocks used to determine the motion vectors. In one example, the error immunity component is configured to determine correlation values for each pel of the reference frame based on a comparison of five by five pel arrays. In such case, the motion vectors stored in input memory component 130 may have been determined on a block basis for blocks of the reference frame pels defined by pel arrays that are at least eight by eight pels in size.

The error immunity component 170 may be further configured to determine variations in motion vectors. For instance, in one example, the error immunity component 170 is further configured to determine for each pel of the reference frame, a variation in motion vectors for a three by three grid of motion vector blocks that contain the pel within the motion vector block at the center of the three by three grid of motion vector blocks. In the FIG. 1 example, the motion vector variance value is stored by the error immunity component 170 as a further metric with respect to the pel in the sixth output memory component 1500.

In the FIG. 1 example, a noise estimation component 180 is configured to estimate the noise level of the reference frame. For each pel of the reference frame, the second comparison metric derived from the motion compensated previous output is compared against a global threshold retrieved from a sixth input memory component 150. A decision is then made as to whether the third comparison metric derived from the motion compensated previous input should contribute to the noise level. Where the second comparison metric derived from the motion compensated previous output is below the global threshold, it is likely that any difference between the motion compensated previous input and motion compensated previous output is primarily due to noise. Accordingly, in such case, the third comparison metric derived from the motion compensated previous input is used in determining a current noise level. As an alternative to a global threshold, a local threshold could readily be used in this context.

In the FIG. 1 example, the current noise level is the average of accumulated values of the third comparison metric over the number of values that contributed to the accumulation. The current noise level may be stored in a further output memory component 1600.

In the FIG. 1 example, a threshold and noise level adjustment component 190 is configured to adjust the threshold noise level, as well as to adjust the current noise level. The threshold and noise level adjustment component 190 is configured to compare the threshold noise level retrieved from the input memory component 150 and the current noise level retrieved from the output memory component 1600, and to decide whether to adjust the threshold to allow for a higher noise level estimation. If the current noise level stored in the output memory component 1600 is too close to the threshold noise level stored in the input memory component 150, it could be an indication that the current threshold is too conservative for the current noise level. The adjustment component 190 will therefore raise the threshold noise level to allow for more noise reduction. The updated threshold noise level is then saved in an additional output memory component 1800. In typical operation of the illustrated example, after the reference frame has been processed, the updated threshold noise level saved in the output memory component 1800 is transferred to the input memory component 150 to become the threshold noise level for processing a "next" frame.

The threshold and noise level adjustment component 190 is also configured to blend the current noise level retrieved from output memory component 1600 with a previous noise level measurements retrieved from an input memory component 140 to produce a final noise level. The amount of blending is generally by a predetermined fixed amount, for example a fixed amount within a range of 0.005 and 1.

The amount of blending may be changed through filter parameters. For example, the amount of allowable noise level skew can be controlled using a scene change detector conditioned with a scene's noise level. If necessary, the threshold and noise level adjustments component 190 clamps the current noise level to a noise level range stored in the input memory component 150, and then saves the final noise level in an output memory component 1700.

Like the noise estimation component 180, the threshold and noise level adjustment component is not limited to working on a global level. Local values for the current noise level can be analyzed instead of global values, and a plurality of local final noise levels and local updated thresholds can be stored in output memory components 1700 and 1800.

In the FIG. 1 example, a gain calculation component 200 is configured to determine the gain associated with the previous output and the motion compensated previous output using the first and second comparison metrics retrieved from the respective output memory components 1200, 1300. For each pel of the reference frame, the component is configured to calculate two values, Gain1 and Gain2, for use by an alpha blending component 220 discussed in more detail below. Gain1 is used to blend the reference frame pel data retrieved from the first input memory component 100 with the previous output retrieved from the second input memory component 110. Gain 2 is used to blend the reference frame pel data with the motion compensated previous output retrieved from the output memory component 1100.

In the FIG. 1 example, the gain calculation component 200 is configured to use a piecewise linear transfer function to calculate the gain for each reference frame pel from the first comparison metric derived from the previous output retrieved from the output memory component 1200 and the second comparison metric derived from the motion compensated previous output retrieved from the output memory component 1300.

Figure 2:
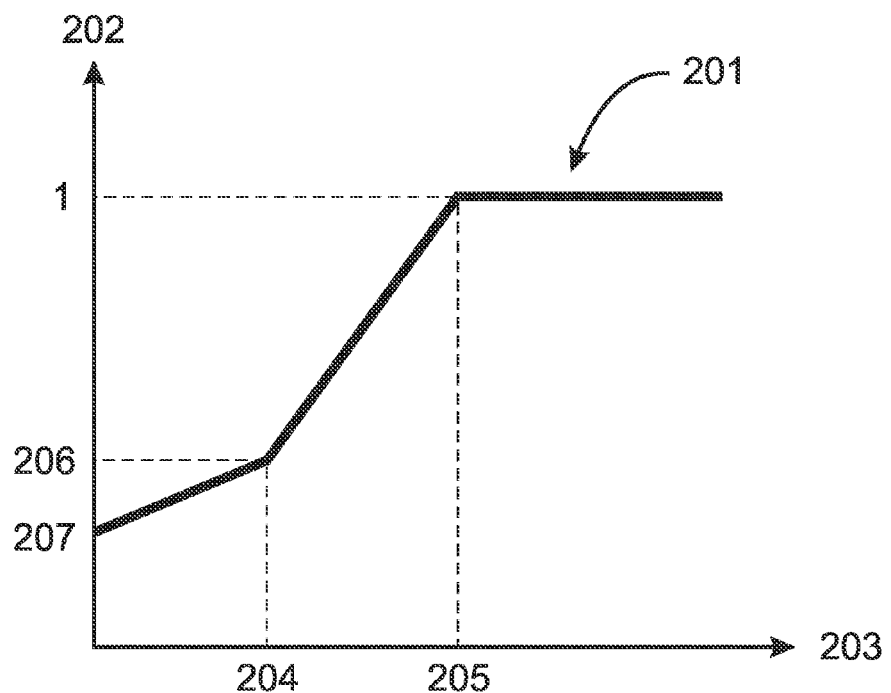
FIG. 2 is a diagrammatic graph of a gain transfer function.

FIG. 2 illustrates an example piece-wise linear function 201 in which the gain 202 is plotted as a function of a comparison metric 203. In this example, the equation for the gain depends on parameters of the noise level 204 stored in the output component 1700, an upper threshold (uT) value 205, a low filtering (lF) value 206 and a heavy filtering (hF) value 207 stored in the input memory component 150.

When the comparison metric is greater than the upper threshold value 205, the filtering is disabled. The bigger the gain is, the less effective the noise reduction is. Once the gain is 1 there is no noise reduction at all.

When the comparison metric is less than the noise level 204, it is possible to do more aggressive noise reduction without worrying about losing sharpness. However, it may not be desirable to treat all comparison metrics that are below the noise level the same. Instead, two different filtering levels, low filtering 206 and heavy filtering 207, are defined, and the gain values between these filter levels are interpolated linearly. In this example function, the heavy filtering 207 is not set to zero to avoid the ghosting effect. The gain values for comparison metrics greater than the noise level are also linearly interpolated, but, in this example, the gain values range from a low filtering value (206) to 1 (no filtering), and the linear function has a greater slope than that for comparison values below the noise level. The example gain equation plotted in FIG. 2 is $$\text{Gain (comparison metric)} = \begin{cases} \frac{(lF - hF) \times \text{comparison metric}}{\text{noise level}} + hF, & \text{comparison metric} \leq \text{noise level} \\ \frac{(1 - hF) \times (\text{comparison metric} - uT)}{uT - \text{noise level}} + 1 & uT \geq \text{comparison metric} > \text{noise level} \\ 1, & \text{comparison metric} > uT \end{cases}$$

where uT is given by uT=a×(noise level)+offset.

The values for a and offset are determined empirically and will be adjusted non-linearly based on the user setting. For example, if the user changes the setting for less noise reduction, but a and offset are re-calculated to produce a smaller upper threshold. The values for a and offset are saved in the input memory component 150. Thus, for each comparison metric retrieved from the output memory components 1200, 1300, a gain value is calculate using the gain function 201 and then stored in a further memory output component 1900.

Pels with comparison metrics smaller than the estimated noise level retrieved from the output memory component 1700 are filtered strongly; otherwise the filtering will be weaker. For example, in the case of the second comparison metric derived from the motion compensated previous output frame, a small value suggests that the difference between the reference frame and the motion compensated previous output frame for that pel is due to noise, and not to motion blurring or other processing errors. The blending of such data can therefore be heavily weighted towards the motion compensated output, which has already been noise reduced.

This weighting corresponds to a small gain value, as illustrated in FIG. 2. Comparison metrics 203 less than the noise level 204 will have a gain value between a low filtering value 206 and a heavy filtering value 207. Conversely, second comparison metric values greater than the estimated noise level stored in the output memory component 1700 can be filtered more weakly, meaning that the blending of pel data will be weighted towards the reference frame data for that pel. This weighting corresponds to larger gain values, as shown in FIG. 2. Comparison metrics greater than the noise level will have gain values between a low filtering value 206 and 1 (no filtering). Filter parameters stored in the input memory component 150 determine the amount of filtering for regions with bigger comparison metrics.

The example blending decision component 210 is configured to calculate a third gain value Gain3 similar to those determined by the gain calculation component 200. This gain, however, is calculated differently and has its own formula. For each pel for the reference frame, the values Gain1 and Gain2 quantify the blending of the reference frame pel data with the previous output and the motion compensated previous output, respectively. Subsequent blending, performed by an alpha blending component 220, results in two new pels: Output1 and Output2 that are in turn selectively combined by the alpha blending component 220.

Output1 is a pel that results from the blending of the reference frame pel data with the previous output frame using Gain1. Output2 is a pel that results from blending the reference frame pel data with the motion compensated output Gain2. The blending decision component 210 is configured to calculate a third blending parameter, Gain3, that is then used by the alpha blending component 220 to determine the blending of the Output1 and Output2 pels. The equation for Gain3 is $$\text{Gain3} = \frac{\text{motion vector metric}}{\text{second comparison metric}} \times \frac{\text{first comparison metric}}{\text{second comparison metric}} \times \frac{1}{\text{motion variance}},$$

where the motion vector metric is previously determined and is supplied by the input memory component 130. This metric is supplied for each reference block, and corresponds to the motion vector selected for that block. The motion variance was determined by the error immunity component 170 and stored in the output memory component 1500. Once calculated, Gain3 determines the contribution of Output1 and Output2 to the final output. For example, if Gain3 is small, the final output is weighted more towards Output 1, the blending of the reference pel with the previous output pel. This is known as motion adaptive filtering. If Gain3 is large, the final output is weighted more toward Output 2, the blending of the reference pel with the motion compensated previous output pel. This is called motion compensated filtering. While the motion variance in the present example is defined as the variation in motion vectors for a three by three grid of motion vector blocks that contain the pel within the motion vector block at the center of the three by three grid of motion vector blocks, various other quantities that provide a metric of the amount of dissimilarity of motion vectors within some constrained/local neighborhood could be used instead.

Thus, the previous output and motion compensated previous output may simultaneously contribute to the output pel data for a given pel of the reference frame produced by the alpha blending component 220.

In the FIG. 1 example, the values for Gain1, Gain2, and Gain3 that are produced by the blending decision component 210 are stored in an output memory component 2000

The alpha blending component 220 is configured to blend pel data from the reference frame, the previous output frame, and motion-compensated previous output frame for each pel of the reference frame. The alpha blending component uses Gain1 to blend the reference frame pel data retrieved from the first input memory component 100 with the previous output retrieved from the second input memory component 110, and Gain2 to blend the reference frame pel data with the motion compensated previous output retrieved from the output memory component 1100. The alpha blending component 220 then blends the pel data from the two blended pels using Gain3 retrieved from the output memory component 2000.

An exemplary equation for the alpha blending to first determine the Output1 and Output2 pels, and to also then use those pels as inputs to determine the pel output from the alpha blending component 220 is output(input pel 1,input pel 2)=(Gain)×(input pel 1)+(1−Gain)×(input pel 2).

As stated previously, heavy filtering of the reference frame corresponds to a small gain value. The reason for this is more evident in light of the alpha blending equation.

For example, in determining the Output2 pel, input pel 1 is a reference frame pel, and input pel 2 is a motion compensated previous output pel, and Gain2 is the Gain for the above equation. A small Gain2 value will result in a small coefficient (Gain2) for the input pel 1, which is the reference frame pel, and a large coefficient (1−Gain2) for the input pel 2, which is the motion compensated previous output pel. Thus, the blending will be weighted toward the motion compensated previous output pel.

Once Output1 and Output2 have been calculated, the following blending equation can be used to blend Output1 and Output2 to create a preliminary output pel:

preliminary output(Output1,Output2)=Gain3×(Output2)+(1−Gain3)×(Output1).

This equation indicates that a small Gain3 value will result in a preliminary final output pel that is weighted more toward Output1, or motion adaptive filtering. A large Gain3 value will result in a preliminary final output pel that is weighted more toward Output 2, or motion compensated filtering. In the FIG. 1 example, the output of the alpha blending component is pel data for each pel of a preliminary output frame of the reference frame, which is stored in an output memory component 2100.

In the FIG. 1 example, the preliminary output frame is inspected by a final artifact protection component 230 to ensure that the pel values are in the previously determined range stored in the output memory component 1500. In the FIG. 1 example, the final artifact protection component, if necessary, clamps the preliminary output frame pel values to the specified range retrieved from output memory component 1500. If the preliminary output frame pel value is greater than the maximum value of that range, the maximum value is used as the final output value for that pel. If the preliminary output frame pel value is less than the minimum value of that range, the minimum value is used as the final output value for that pel. The final output frame is stored in an output memory component 2200. For a "next" frame, the final output frame is stored in input memory component 110 as the previous output.

Although this example of the apparatus is directed to blending of Output1 (reference frame pel blended with the previous output pel) and Output 2 (reference frame pel with the motion compensated previous output pel) to produce the preliminary output frame pels, the blending decision component 210 and alpha blending component 220 could instead be configured to choose either Output1 or Output2 for each pel of the reference frame to become a pel of the preliminary output frame. In such case, the alpha blending component 220 need only to perform a single blending for each pel to produce either the Output1 or Output2 pel in accordance with the blending decision. Such a choice can be based on the first and second comparison metrics. For example, if the SAD comparison operation is used, a smaller SAD value indicates a higher correlation between the blocks of pels being compared. Thus, the output having the smaller SAD value could be used as the preliminary output pel. Alternative approaches, such as a piecewise linear function or a series of logic statements depending on the comparison metrics, could also be used.

If the blending decision component chooses Output1, the alpha blending component blends the reference frame pel data with the previous output frame pel data, and the output is stored in the output memory component 2200. If the blending decision component chooses Output2, the reference frame pel data is blended with the motion compensated previous output frame pel data, and the output is stored in the output memory component 2200.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of processors, one or more processors in association with a DSP core, a controller, a microcontroller, Application Specific Integrated Circuits (ASICs), Field Programmable Gate Arrays (FPGAs) circuits, any other type of integrated circuit (IC), and/or a state machine.

Embodiments of the invention may be represented as instructions and data stored on a computer readable memory. For example, aspects of the invention may be included in a hardware description language (HDL) code stored on such computer readable media. Such instructions, when processed may generate other intermediary data (e.g., net lists, GDS data, or the like) that can be used to create mask works that are adapted to configure a manufacturing process (e.g., a semiconductor fabrication facility). Once configured, such a manufacturing process is thereby adapted to manufacture processors or other semiconductor devices that embody aspects of the present invention.

What is claimed is:

1. An apparatus for facilitating processing image data of video frames comprising:
   a processing component configured to process a reference frame to produce an output frame including:
      a first input configured to receive motion vector data for a block of pels of the reference frame that estimates the displacement of the reference frame pels from corresponding pels in a prior input frame; and
      a second input configured to receive pel data for pels of a prior output frame corresponding to the prior input frame as previously processed;
   the processing component configured to produce comparison metrics for a reference frame pel of the reference frame block based on a comparison of the reference frame pel and a plurality of neighboring reference frame pels with pels of the prior output frame including:
      a first comparison metric based on a comparison with corresponding pels of the prior output frame; and
      a second comparison metric based on a comparison with corresponding pels of a motion compensated prior output frame derived from applying the motion vector data for the reference frame block to the pels of the prior output frame; and
   the processing component configured to determine a pel of the output frame that corresponds to the reference frame pel using the first and second comparison metrics;
   wherein the processing component is configured to use the first comparison metric to determine a first gain for use in blending the reference frame pel with a corresponding pel of the prior output frame to produce a first blended pel and to use the second comparison metric to determine a second gain for use in blending the reference frame pel with a corresponding pel of the motion compensated prior output frame to produce a second blended pel; and
   wherein the processing component is configured to produce the first and second blended pels and to use the first and second comparison metrics, a motion vector variance value, and a motion vector metric to determine a third gain for use in blending the first and second blended pels to produce a third blended pel upon which the output frame pel corresponding to the reference frame pel is based.

2. The apparatus of claim 1 wherein the processing component is configured to use the third blended pel as the output frame pel upon a condition that the third blended pel is in a range determined from the pel values of the reference frame pel and the plurality of neighboring reference frame pels.

3. An apparatus for facilitating processing image data of video frames comprising:
   a processing component configured to process a reference frame to produce an output frame including:
      a first input configured to receive motion vector data for a block of pels of the reference frame that estimates the displacement of the reference frame pels from corresponding pels in a prior input frame; and
      a second input configured to receive pel data for pels of a prior output frame corresponding to the prior input frame as previously processed;
   the processing component configured to produce comparison metrics for a reference frame pel of the reference frame block based on a comparison of the reference frame pel and a plurality of neighboring reference frame pels with pels of the prior output frame including:
      a first comparison metric based on a comparison with corresponding pels of the prior output frame; and
      a second comparison metric based on a comparison with corresponding pels of a motion compensated prior output frame derived from applying the motion vector data for the reference frame block to the pels of the prior output frame; and
   the processing component configured to determine a pel of the output frame that corresponds to the reference frame pel using the first and second comparison metrics;
   wherein the processing component is configured to use the first comparison metric to determine a first gain for use in blending the reference frame pel with a corresponding pel of the prior output frame to produce a first blended pel and to use the second comparison metric to determine a second gain for use in blending the reference frame pel with a corresponding pel of the motion compensated prior output frame to produce a second blended pel;
   wherein the processing component is configured to produce either the first blended pel or the second blended pel as a selected blended pel upon which the output frame pel corresponding to the reference frame pel is based; and
   wherein the processing component is configured to use the selected blended pel as the output frame pel upon a condition that the selected blended pel is in a range determined from the pel values of the reference frame pel and the plurality of neighboring reference frame pels.

4. An apparatus for facilitating processing image data of video frames comprising:
   a processing component configured to process a reference frame to produce an output frame including:
      a first input configured to receive motion vector data for a block of pels of the reference frame that estimates the displacement of the reference frame pels from corresponding pels in a prior input frame; and
      a second input configured to receive pel data for pels of a prior output frame corresponding to the prior input frame as previously processed;
   the processing component configured to produce comparison metrics for a reference frame pel of the reference frame block based on a comparison of the reference frame pel and a plurality of neighboring reference frame pels with pels of the prior output frame including:
      a first comparison metric based on a comparison with corresponding pels of the prior output frame; and
      a second comparison metric based on a comparison with corresponding pels of a motion compensated prior output frame derived from applying the motion vector data for the reference frame block to the pels of the prior output frame; and the processing component configured to determine a pel of the output frame that corresponds to the reference frame pel using the first and second comparison metrics;

wherein the processing component is configured to use the first comparison metric to determine a first gain for use in blending the reference frame pel with a corresponding pel of the prior output frame to produce a first blended pel and to use the second comparison metric to determine a second gain for use in blending the reference frame pel with a corresponding pel of the motion compensated prior output frame to produce a second blended pel; and wherein the processing component is configured to:
produce a third comparison metric for the reference frame pel based on a comparison of the reference frame pel and the plurality of neighboring reference frame pels with corresponding pels of a motion compensated prior input frame derived from applying the motion vector data for the reference frame block to the pels of the prior input frame; and
use the second and third comparison metrics in determining a noise level that is used in determining the first and second gains.

5. The apparatus of claim 4 wherein the processing component is configured to produce the first and second comparison metrics for the reference frame pel based on a comparison of a pel region defined by the reference frame pel and the plurality of neighboring pels that has fewer pels than the reference frame block.

6. The apparatus of claim 5 where the reference frame block is defined by at least an eight by eight pel array wherein the processing component is configured to produce the first and second comparison metrics for the reference frame pel based on a comparison of a pel region defined by a five by five pel array about the reference frame pel.

7. The apparatus of claim 1 wherein the processing component is configured to calculate the first and second comparison metrics for the output frame based on a sum of the absolute differences (SAD) comparative calculation.

8. A method of processing image data of a reference frame to produce an output frame comprising:
determining motion vector data for a block of pels of the reference frame that estimates the displacement of the reference frame pels from corresponding pels in a prior input frame; and
producing comparison metrics for a reference frame pel of the reference frame block based on a comparison of the reference frame pel and a plurality of neighboring reference frame pels with pels of a prior output frame that corresponds to the prior input frame as previously processed including:
a first comparison metric based on a comparison with corresponding pels of the prior output frame; and
a second comparison metric based on a comparison with corresponding pels of a motion compensated prior output frame derived from applying the motion vector data for the reference frame block to the pels of the prior output frame; and
determining a pel of the output frame that corresponds to the reference frame pel using the first and second comparison metrics;
wherein the determining a pel of the output frame includes:
using the first comparison metric to determine a first gain for use in blending the reference frame pel with a corresponding pel of the prior output frame to produce a first blended pel; and
using the second comparison metric to determine a second gain for use in blending the reference frame pel with a corresponding pel of the motion compensated prior output frame to produce a second blended pel; and
wherein the determining a pel of the output frame includes:
producing the first and second blended pels;
using the first and second comparison metrics, a motion vector variance value, and a motion vector metric to determine a third gain; and
using the third gain in blending the first and second blended pels to produce a third blended pel.

9. The method of claim 8 wherein the determining a pel of the output frame includes:
using the third blended pel as the output frame pel upon a condition that the third blended pel is in a range determined from the pel values of the reference frame pel and the plurality of neighboring reference frame pels.

10. A method of processing image data of a reference frame to produce an output frame comprising:
determining motion vector data for a block of pels of the reference frame that estimates the displacement of the reference frame pels from corresponding pels in a prior input frame; and
producing comparison metrics for a reference frame pel of the reference frame block based on a comparison of the reference frame pel and a plurality of neighboring reference frame pels with pels of a prior output frame that corresponds to the prior input frame as previously processed including:
a first comparison metric based on a comparison with corresponding pels of the prior output frame; and
a second comparison metric based on a comparison with corresponding pels of a motion compensated prior output frame derived from applying the motion vector data for the reference frame block to the pels of the prior output frame; and
determining a pel of the output frame that corresponds to the reference frame pel using the first and second comparison metrics;
wherein the determining a pel of the output frame includes:
using the first comparison metric to determine a first gain for use in blending the reference frame pel with a corresponding pel of the prior output frame to produce a first blended pel; and
using the second comparison metric to determine a second gain for use in blending the reference frame pel with a corresponding pel of the motion compensated prior output frame to produce a second blended pel;
wherein the determining a pel of the output frame includes producing either the first blended pel or the second blended pel as a selected blended pel upon which the output frame pel corresponding to the reference frame pel is based; and
wherein the determining a pel of the output frame includes:
using the selected blended pel as the output frame pel upon a condition that the selected blended pel is in a range determined from the pel values of the reference frame pel and the plurality of neighboring reference frame pels.

11. A method of processing image data of a reference frame to produce an output frame comprising:
  determining motion vector data for a block of pels of the reference frame that estimates the displacement of the reference frame pels from corresponding pels in a prior input frame; and
  producing comparison metrics for a reference frame pel of the reference frame block based on a comparison of the reference frame pel and a plurality of neighboring reference frame pels with pels of a prior output frame that corresponds to the prior input frame as previously processed including:
    a first comparison metric based on a comparison with corresponding pels of the prior output frame; and
    a second comparison metric based on a comparison with corresponding pels of a motion compensated prior output frame derived from applying the motion vector data for the reference frame block to the pels of the prior output frame; and
  determining a pel of the output frame that corresponds to the reference frame pel using the first and second comparison metrics;
  wherein the determining a pel of the output frame includes:
    using the first comparison metric to determine a first gain for use in blending the reference frame pel with a corresponding pel of the prior output frame to produce a first blended pel; and
    using the second comparison metric to determine a second gain for use in blending the reference frame pel with a corresponding pel of the motion compensated prior output frame to produce a second blended pel; and wherein:
    the producing comparison metrics for the reference frame pel includes producing a third comparison metric for the reference frame pel based on a comparison of the reference frame pel and the plurality of neighboring reference frame pels with corresponding pels of a motion compensated prior input frame derived from applying the motion vector data for the reference frame block to the pels of the prior input frame; and
    the determining a pel of the output frame includes using the second and third comparison metrics in determining a noise level that is used in determining the first and second gains.

12. The method of claim 11 wherein the producing comparison metrics for the reference frame pel includes producing the first and second comparison metrics for the reference frame pel based on a comparison of a pel region defined by the reference frame pel and the plurality of neighboring pels that has fewer pels than the reference frame block.

13. The method of claim 12 where the reference frame block is defined by at least an eight by eight pel array wherein the producing comparison metrics for the reference frame pel includes producing the first and second comparison metrics for the reference frame pel based on a comparison of a pel region defined by a five by five pel array about the reference frame pel.

14. The method of claim 8 wherein the producing comparison metrics for the reference frame pel includes calculating the first and second comparison metrics for the output frame based on a sum of the absolute differences (SAD) comparative calculation.

15. A non-transitory computer-readable storage medium storing a set of instructions for execution by a processor to facilitate processing of video image data of a reference frame to produce an output frame that is adapted to:
  determine motion vector data for a block of pels of the reference frame that estimates the displacement of the reference frame pels from corresponding pels in a prior input frame; and
  produce comparison metrics for a reference frame pel of the reference frame block based on a comparison of the reference frame pel and a plurality of neighboring reference frame pels with pels of a prior output frame that corresponds to the prior input frame as previously processed including:
    a first comparison metric based on a comparison with corresponding pels of the prior output frame; and
    a second comparison metric based on a comparison with corresponding pels of a motion compensated prior output frame derived from applying the motion vector data for the reference frame block to the pels of the prior output frame; and
  determine a pel of the output frame that corresponds to the reference frame pel using the first and second comparison metrics;
  wherein the determine a pel of the output frame includes:
    using the first comparison metric to determine a first gain for use in blending the reference frame pel with a corresponding pel of the prior output frame to produce a first blended pel; and
    using the second comparison metric to determine a second gain for use in blending the reference frame pel with a corresponding pel of the motion compensated prior output frame to produce a second blended pel; and
  wherein the determine a pel of the output frame includes:
    produce the first and second blended pels;
    using the first and second comparison metrics, a motion vector variance value, and a motion vector metric to determine a third gain; and
    using the third gain in blending the first and second blended pels to produce a third blended pel.

16. A non-transitory computer-readable storage medium storing a set of instructions for execution by one or more processors to facilitate manufacture of circuitry within an integrated circuit that is adapted to:
  process a reference frame to produce an output frame including:
    a first input configured to receive motion vector data for a block of pels of the reference frame that estimates the displacement of the reference frame pels from corresponding pels in a prior input frame; and
    a second input configured to receive pel data for pels of a prior output frame corresponding to the prior input frame as previously processed;
  produce comparison metrics for a reference frame pel of the reference frame block based on a comparison of the reference frame pel and a plurality of neighboring reference frame pels with pels of the prior output frame including:
    a first comparison metric based on a comparison with corresponding pels of the prior output frame; and
    a second comparison metric based on a comparison with corresponding pels of a motion compensated prior output frame derived from applying the motion vector data for the reference frame block to the pels of the prior output frame; and
  determine a pel of the output frame that corresponds to the reference frame pel using the first and second comparison metrics;

wherein the determining a pel of the output frame includes:
  using the first comparison metric to determine a first gain for use in blending the reference frame pel with a corresponding pel of the prior output frame to produce a first blended pel; and
  using the second comparison metric to determine a second gain for use in blending the reference frame pel with a corresponding pel of the motion compensated prior output frame to produce a second blended pel; and
wherein:
  the producing comparison metrics for the reference frame pel includes producing a third comparison metric for the reference frame pel based on a comparison of the reference frame pel and the plurality of neighboring reference frame pels with corresponding pels of a motion compensated prior input frame derived from applying the motion vector data for the reference frame block to the pels of the prior input frame; and
  the determining a pel of the output frame includes using the second and third comparison metrics in determining a noise level that is used in determining the first and second gains.

17. The computer-readable storage medium of claim 16, wherein the instructions are hardware description language (HDL) instructions used for the manufacture of a device.

* * * * *